United States Patent
Müller et al.

(10) Patent No.: US 7,750,055 B2
(45) Date of Patent: Jul. 6, 2010

(54) POLYVINYL ALCOHOL MIXTURE GELS

(75) Inventors: Rolf Müller, Zürich (CH); Federico Innerebner, Zürich (CH)

(73) Assignee: InnoGEL AG, Huenenberg (CH)

( * ) Notice: Subject to any disclaimer, the term of this patent is extended or adjusted under 35 U.S.C. 154(b) by 976 days.

(21) Appl. No.: 10/553,518

(22) PCT Filed: Apr. 15, 2004

(86) PCT No.: PCT/CH2004/000231

§ 371 (c)(1),
(2), (4) Date: Nov. 18, 2005

(87) PCT Pub. No.: WO2004/092264

PCT Pub. Date: Oct. 28, 2004

(65) Prior Publication Data

US 2006/0205862 A1    Sep. 14, 2006

(30) Foreign Application Priority Data

Apr. 15, 2003    (DE) .............................. 103 17 418

(51) Int. Cl.
*C08L 29/04* (2006.01)

(52) U.S. Cl. .............................. 516/77; 525/56; 525/61
(58) Field of Classification Search ................... 516/77; 525/56, 61
See application file for complete search history.

(56) References Cited

U.S. PATENT DOCUMENTS

| | | | |
|---|---|---|---|
| 4,542,013 A | 9/1985 | Keith | |
| 4,835,198 A * | 5/1989 | Kohno et al. | 524/47 |

FOREIGN PATENT DOCUMENTS

| | | | |
|---|---|---|---|
| JP | 61261341 A | * | 11/1986 |
| JP | 64002647 A | * | 1/1989 |
| JP | 05245138 | | 9/1993 |
| JP | 07117327 | | 5/1995 |

* cited by examiner

*Primary Examiner*—Kelechi C Egwim
(74) *Attorney, Agent, or Firm*—K&L Gates LLP (57) ABSTRACT

Polyvinyl alcohol gels, particularly hydrogels, which are produced by methods and formulas and are provided with a characteristic profile that is adjustable to a large extent, e.g. outstanding mechanical properties with moduli of elasticity of 30 MPa and stiffnesses of 25 MPa at a breaking elongation of 550 percent, or full transparency in a wide range of water contents.

25 Claims, 4 Drawing Sheets

POLYVINYL ALCOHOL MIXTURE GELS

BACKGROUND OF THE INVENTION

The present invention relates to polyvinyl alcohol gels, especially hydrogels manufactured using new methods and formulations and having a property profile which can be adjusted over a wide range of excellent mechanical properties.

Polyvinyl alcohol (PVA) which can be obtained by hydrolysis of polyvinyl acetate for example is almost completely biologically degradable and has good water solubility at elevated temperature. PVA-based hydrogels can be manufactured with the consistency of biological tissue and cartilage and exhibit exceptional stability and biocompatibility in the living organism, which is attributable on the one hand to the high water content of these gels and on the other hand to the macromolecule itself which, as a result of the numerous hydroxyl groups similar to water is "perceived as polymerised long-chain water" by the body when pointedly expressed. Thus, PVA gels (PVAG) are almost predestined for applications in the living organism, especially PVAG manufactured without chemical cross-linking, radiation cross-linking and without the aid of problematical chemicals.

In the conventional methods for manufacturing these PVAGs in a first step at elevated temperatures of 120° C., for example, a solution of PVA is prepared and this can be poured into a mould cooled to room temperature. Various methods for gel formation are applied subsequently wherein the PVA solution is frozen at least once and then thawed again (freeze/thaw). Typically, the solvent is water, the PVA solutions have a PVA concentration $C_p$ in the range of 5-15% and are cooled at cooling rates of about 0.1° C./min to temperatures of around −15 to −30° C., left at this temperature for about 1-24 h and then thawed again at about 0.1° C./min. After such a cycle the PVAGs are opaque and very soft. They can already be damaged by touching, the strength sm of a PVAG with $C_p$=15%, for example, is in the range of 0.04 MPa and the modulus of elasticity E is in the range of 0.01 MPa. The mechanical properties are continually improved by repeating the freeze/thaw treatment, after 10 cycles for example, the strength sm is in the range of 1 MPa and the modulus of elasticity in the range of 0.1 MPa. After further cycles, the mechanical properties are only slightly further improved. Such PVAGs have been described on numerous occasions in the prior art, for example, F. Yokohama et al. in Colloid & Polymer Science (1986), 264, pages 595-601.

A modified method is described in U.S. Pat. No. 4,734,097 wherein, starting from an aqueous PVA solution, e.g. in example 3 with $C_p$=8% only one freeze/thaw cycle is applied and the PVA-water mixture is dehydrated to a concentration $C_p$ of 42% in the frozen state by using a vacuum for 10 hours. After thawing, a whitish opaque gel having a strength sm of 0.5 MPa is obtained, which was suggested for use as artificial tissue in the human body. Applications to patent PVAG manufactured by this method have been made for numerous applications, for example, for artificial organs and membranes in EP 0107055 (artificial organs or membranes for medical use), as dermal gels in EP 0095892 (wound-covering materials), for use as cooling medium in EP 0070986 (gel for use as cooling-medium), as insulation gel for low temperatures in JP 57190072, as phantoms for NMR diagnosis in GB 2209401 (phantoms for NMR diagnosis) or as golf ball filling in GB 2182571 (golf ball cores).

A further modified method is described in U.S. Pat. No. 6,231,605 wherein, starting from an aqueous PVA solution, e.g. in example 1 with $C_p$=15% three freeze/thaw cycles were first applied at −20° C. whereafter the gel obtained was placed in water and thus swollen. The gel was transparent in this state but so weak that it could not maintain its shape outside water. The swollen gel was then subjected to another two freeze/thaw treatments and an opaque elastic gel having a modulus of elasticity of around 0.4 MPa was then obtained. Such gels were also proposed for use as tissue replacement in the human body, e.g. for heart valves, vessels, tendons, cartilage, urethral meniscus.

In a further modified method in U.S. Pat. No. 4,663,358 the PVA solution is prepared using mixtures of water and organic solvents, especially DMSO, and then frozen at −20° C. The gel obtained is then stored in water to extract most of the DMSO, dried in the atmosphere and then under vacuum to extract the remainder of the DMSO. After swelling the samples in water, PVAG was obtained which had a transparency of up to 99% and strengths of up to 5.6 MPa. Such transparent PVAG was proposed for applications in the field of biomedicine and for the food industry.

As has been mentioned, said methods for manufacturing biocompatible PVAG have the common feature that they start from a pourable solution and at least one freeze/thaw cycle is applied. It is known to the person skilled in the art that the mechanical properties of the PVAG obtained in the various versions of the method increase with the concentration $C_p$ of the PVA used in the solution, with increasing degree of polymerisation DP and with increasing degree of hydrolysis. In this method, however, the parameters $C_p$ and DP cannot be optimised independently of each other since advantageous higher degrees of polymerisation DP cause the viscosity of the solution to increase substantially so that it becomes difficult to prepare a solution and it is no longer pourable. Maximum solution viscosities lie in the range of 10,000 mPa. For example, Mowiol 66-100, one of the highest-molecular commercially available PVAs with a degree of hydrolysis DH of 99.4% and a degree of polymerisation DP of around 4,500 already has the maximum processable viscosity of 10,000 mPa at a concentration $C_p$ of 10% at room temperature, at 80° C. the limiting concentration $C_p$ is around 15%. In the case of higher-molecular PVA, the limiting concentration is even lower. This is an important disadvantage of the conventional methods. A further disadvantage is the long time required by the conventional methods, a single freeze/thaw cycle for example lasts at least 24 h, dehydration by lyophilisation takes about 10 h, the removal of organic solvents takes days. On the whole it is desirable to be able to process higher concentrations $C_p$, to develop simpler and shorter methods, to improve the mechanical properties of PVAG (higher strengths and moduli of elasticity) and to achieve transparency even in pure PVA water systems without the assistance of organic solvents which must be 100% removed again, which is barely possible in practice since traces thereof always remain.

SUMMARY OF THE INVENTION

The present invention describes new possibilities with regard to the type of PVA used and new methods whereby these aims can be achieved and polyvinyl alcohol gels with tailored properties for different applications can be obtained.

The invention comprises measures relating to the type of PVA used and the method wherein both measures can be used singly or in combination.

Whereas completely hydrolysed PVA having highest degrees of polymerisation DP of up to around 18,000 have preferably been used hitherto for PVAG having high strengths and moduli of elasticity, in the present invention an opposite approach is adopted at least partly.

On the one hand, a first, preferably completely hydrolysed PVA1 with high DP is used, on the other hand a preferably completely hydrolysed PVA2 having moderate and especially low DP in the range of about 1000-50 is used in combination with this PVA1. It is immediately clear that by mixing PVA1 and PVA2 the viscosity of the solution is reduced and higher concentrations Cp can be processed by means of solution methods. Mowiol 3-98 with DP=360 for example has a viscosity of only 100 mPa at Cp=20% and at RT and the limiting viscosity of 10,000 mPa at RT is only achieved at Cp of around 60%. At 100° C. Cp can even be around 70%.

It would initially be expected that the mechanical properties of the resulting PVAG are reduced by the fraction of PVA2 and the advantage of the higher solution concentration is thus at least partly cancelled out thereby. However, an opposite effect was surprisingly found. If a fraction of PVA1 is replaced by PVA2 at the same Cp, PVAG having higher moduli of elasticity are obtained whereby the assumed disadvantage appears as an advantage and is added to the obvious advantage of the higher solution concentration Cp. This effect of PVA2 can be explained by the fact that short-chain PVA can crystallise very well, i.e., quickly and completely whereby the crystalline fraction of the PVAG is increased. Heterocrystallisation of PVA1 and PVA2 also takes place, i.e. the crystallites forming the linking points of the network constituting the gel have both PVA1 and PVA2 macromolecules wherein the shorter-chain PVA2 macromolecules induce the crystallisation of segments of PVA1 macromolecules to heterocrystallites. Thus, overall higher network densities are achieved, i.e., finer-meshed networks and therefore higher moduli of elasticity of the resulting PVAG.

The mechanical properties of PVAG can be further improved by using PVA3 which comprises long-chain branchings where the DP of these long chains is >50, especially if PVA3 is used in combination with PVA2 and/or PVA1. Since the various side chains are incorporated in various crystallites by heterocrystallisation, additional network linking points are formed, these linking points then being of a covalent nature.

A further possibility for increasing the concentration Cp of the PVA-water system involves using thermoplastic methods where a PVA melt is produced instead of the PVA solution and can be treated at viscosities far higher than 10,000 mPa. Thus, even extremely high-molecular PVA can be brought into the amorphous state at concentrations Cp >>15% from which gels can be formed. Shaping is then no longer possible using the conventional casting technology but shaped bodies can be obtained by methods similar to those used in the processing of thermoplastic materials, for example, by die casting and injection moulding or extrusion and pressing methods. Whereas hitherto concentrations Cp in the range of 5 to a maximum of 30% (depending on the DP of the PVA) were common, the range of 30 to about 90% is now possible and concentrations Cp lower than 30% are also possible with this method, which is especially the case at very high DP. With increasing Cp, on transition from solutions to gel formation, PVA-water mixtures increasingly show very different behaviour in relation to gel formation compared to gel formation from the solution. Whereas in the new method water must be extracted from the PVA as a result of the freezing process (formation of phases of frozen ice in addition to phases with very high Cp or low water content) and crystallisation is thereby induced, in the new method Cp is high from the beginning and it is no longer absolutely necessary to use freeze/thaw cycles. Gel or network formation by crystallisation is also possible at higher temperatures. For example, when Cp is around 40%, gel formation at room temperature is just as effective as when applying freeze/thaw cycles. The higher Cp is set, the higher the temperature at which gel formation begins so that even heat treatments at temperatures >RT can be used. In the simplest case, after shaping a PVA-water mixture can simply be stored at RT wherein gel formation proceeds on a time scale of hours to days. The strength of the PVAG obtained increases continuously with Cp, wherein values of 25 MPa, for example, and moduli of elasticity of 30 MPa can be set and in addition, complete transparency can be obtained. If PVAG prepared in this fashion is placed in water, swelling takes place, whereby Cp and the mechanical properties decrease. The degree of swelling is substantially determined by the set network density and can also be adjusted in a defined fashion by its parameters, especially minimised. The temperature of the gel formation and especially the use of PVA2 play an important role here whereby the combination of the two measures described here for manufacturing new polyvinyl alcohol gels acquires a particular importance. A further advantage of using short-chain PVA2 is that not only the viscosity of solutions at low Cp but also the viscosity of melts at high Cp can be massively reduced whereby, when thermoplastic methods are used, the temperature during plasticisation can be controlled, especially kept low and thus melts with very high Cp can also be processed.

DETAILED DESCRIPTION

For the selection of suitable PVA types a distinction is made between three groups of parameters, the parameters relating to the regularity of the PVA such as degree of hydrolysis DH, 1,2-glycol content G, tacticity, and fraction of short-chain branchings, the parameters of the molecular weight distribution such as DPn, DPw and the parameters for the topology of the macromolecules such as degrees of branching of long chains and length of these long or side chains.

With regard to the first group of parameters, the same requirements are imposed on PVA1, PVA2 and PVA3 which make it possible to achieve the highest possible crystallisability of the PVA and high stability of the crystallites. Thus, deviations from the ideal structure $[-CH_2-CHOH-]_n$ should be kept proportionately as low as possible.

The degree of hydrolysis DH in mole % is >95, preferably >98, more preferably >99, most preferably >99.8.

The 1,2-glycol content G in mole % is <3, preferably <1, more preferably <0.5, most preferably <0.2.

The number of short-chain branchings per monomer unit is $<10^{-2}$, preferably $<10^{-3}$, more preferably $<10^{-4}$, most preferably $<10^{-6}$.

Further disturbances of the regularity such as carbonyl groups in the chain are also undesirable but in conventional PVA their fraction is negligible at typically <0.02 mole %.

With regard to tacticity, an atactic conformation is preferred compared with an atactic one, most preferably a syndiotactic conformation or the highest possible fraction of syndiotactic dyads. The tacticity of PVA is determined by the type of monomers with which the precursor polymer is polymerised, from which the PVA is then obtained, and by the reaction conditions accompanying this polymerisation where the syndiotactic fraction increases with decreasing temperature during polymerisation.

If the precursor polymer is polymerised from vinyl acetate derivatives of the type $CH_2=CHOCOR$, where R, for example can be H, $CH_3$, $C_3H_7$, $C_4H_9$, $CClH_2$, $CCl_3$, $CF_3$, $C_4H_5F_4$, $C_6H_7F_6$ or $C_6H_5$, the fraction of syndiotactic dyads increases with the volume of the R group (whereas the 1,2-glycol content advantageously decreases) and the tacticity obtained in the precursor polymer is retained during the subsequent hydrolysis to PVA. Thus, monomers such as vinyl acetate, vinyl chloroacetate, vinyl dichloroacetate, vinyl bromoacetate, especially vinyl trifluoroacetate are preferred for polymerisation of the precursor polymer.

If the precursor polymer is prepared from aliphatic vinyl acid esters, high fractions of syndiotactic dyads are also obtained whereas the resulting PVA also has very low 1,2-glycol contents. Examples are vinyl formate, vinyl proprionate, vinyl butyrate and vinyl pivalate. Very high molecular weights can also be obtained using vinyl pivalate.

Completely hydrolysed PVAs obtained from polyvinyl acetate are also soluble in water with high degrees of crystallisation at 100° C. whereas completely hydrolysed PVA whose precursor polymer was prepared from vinyl acetate derivatives with a bulky R group (e.g. vinyl trifluoroacetate) or from aliphatic vinyl acid esters (e.g. vinyl fromate, vinyl pivalate) can be obtained in insoluble form even at 100° C. as a result of the low 1,2-glycol content and the high content of syndiotactic dyads. The importance of these parameters for the crystallinity and the stability of the crystallites becomes clear from this. Such PVA are thus quite particularly suitable for the present invention.

With regard to the molecular weight distribution, different requirements are imposed on PVA1, PVA2 and PVA3. For conventional PVAG based on only one PVA, a value of 1000 to 1500 is typically given in the literature as a lower limit for the average degree of polymerisation DP, where the type of average (DPn, DPw, DPv) is not specified in most cases. The polydispersivity $P=DPw/DPn$ of PVA obtained from polyvinyl acetate by saponification lies in a range of about 2-2.5 with which these averages can be converted and interpretation is possible. When DP is around 500, crumbly and brittle PVAGs are obtained by conventional methods. This is understandable since the macromolecules are not long enough to form effective bonds between crystallites. Thus, the crystallites can easily slide against one another and scarcely any strength is obtained. The crumbly consistency increases further with decreasing DP. A prerequisite for effective bonds is that at least two segments of a macromolecule are incorporated in at least two crystallites. With increasing DP there is an increase in the number of crystallites in which different segments of a PVA macromolecule are involved and mechanically more stable and increasingly elastic networks are obtained, which is why the highest possible DP are advantageous in conventional PVAG. The fact that only crumbly and brittle PVAG are obtained at low DP may be a reason why low DP have hitherto not been considered for PVAG.

For the present invention PVAs with DP >1000, preferably >2000, more preferably >3000, most preferably >5000 are used for PVA1 and PVA3. The upper limit is given by the prior art for the manufacture of extremely high-molecular PVA and at present PVA with DP up to approximately 18,000 can be manufactured.

PVA with comparatively low DP are used for PVA2, on the one hand to reduce the viscosity of the solutions and melts, on the other hand to obtain high crystallisation rates and degrees of crystallinity as well as high network densities. PVA2 with DP in the range of 50-1000, preferably 60-500, more preferably 70-300, most preferably 75-200 is used for the present invention. The lower limit is determined by the stability of the crystallites formed by PVA2 (wherein segments of PVA1 and PVA3 are incorporated by heterocrystallisation). The lamella thickness of these crystallites at low DP is directly proportional to the DP and the stability with respect to temperature and solvent (water) increases with the lamella thickness. At high DP the lamella thickness mostly decreases again since the macromolecules then no longer crystallise in the fully stretched conformation but a folding back preferably takes place and deeper lamella thicknesses result. Thus, a positive effect with regard to the stability of the crystallites can be obtained by the choice of suitable DP for PVA2 which is especially important for in vivo applications. The optimal DP range in this respect is around 75-200.

With regard to the polydispersivity $P=DPw/DPn$ of the three PVA types, especially in the case of PVA2, P is preferably <5, more preferably <3, most preferably <2.

With regard to the topology, conventional PVAs are predominantly linear, long-chain branchings then occur rarely, if at all, in conventional PVA. Almost complete or complete linearity is preferred for short-chain PVA2, wherein this condition is almost always satisfied, whereas long-chain PVA1 need not necessarily be as linear as possible, and a fraction of long-chain branchings can even be advantageous for PVA1 if the length of these side chains has a DP >50. For PVA3 on the other hand, a significant fraction of long-chain branchings is a decisive property feature for its functionality and the same requirements apply for the degrees of polymerisation DP of these long or side chains as for the DP of PVA2. It is thus possible that the various side chains of a PVA3 macromolecule can be incorporated into different crystallites (together with PVA1 and/or PVA2), resulting in an additional cross-linking of these crystallites, that is higher network densities are obtained. At the present time, PVAs of the type PVA3 are not available commercially. However, from PVA obtained from polyvinyl benzoate it is known that long-chain branchings can be obtained under suitable reaction conditions during the polymerisation of vinyl benzoate. Another possibility for manufacturing PVA3 can be provided by grafting PVA of the type PVA2 onto PVA of the type PVA1, where the number and length of the side chains can be adjusted.

The fraction of PVA2 relative to PVA in wt. % is in the range of 1-95, preferably 2-90, most preferably 3-85. A high fraction of PVA2 is especially advantageous for adjusting high moduli of elasticity, where very high strains are, astonishingly, still obtained.

The fraction of PAV3 relative to PVA in wt. % is in the range of 1-80, preferably 2-60, most preferably 3-50.

The fraction of PVA relative to PVA and swelling agent in wt. % is in the range of 5-90, preferably 7-95, most preferably 10-80.

At concentrations Cp of polyvinyl alcohol <30%, gel formation preferably takes place by means of freeze/thaw methods or variants thereof described in the prior art although when PVA2 is used, on the one hand higher concentrations can be processed as solutions as a result of a reduction in viscosity and on the other hand, gel formation takes place more quickly. Thermoplastic methods are used when the viscosity is too high for preparing solutions and pouring these solutions. An advantage of thermoplastic methods is also that homogeneous mixtures of PVA and swelling agent can be prepared very much more quickly than by solution methods where autoclaves also need to be used in most cases. A bubble-free homogeneous mixture can be obtained by extrusion, for example, within 1-5 min whereas the preparation of solutions takes around one hour and the solutions typically have air bubbles which become increasing more difficult to remove as the viscosity of the solution increases. In addition, thermoplastic methods also allow continuous preparation of PVA-swelling agent mixtures and in principle, arbitrarily large quantities can be processed whereas the solution method which is carried out as a batch method, typically operates in the 100 g range.

At concentrations Cp in the range of about 30-40%, gel formation can take place without freeze/thaw methods, for example by storing the mixture at a temperature above the freezing point of the mixture. The optimal storage temperature increases with Cp but also depends on the fraction of PVA2 and the structure parameters of the PVA. In this concentration range the mechanical properties which can be obtained by freeze/thaw methods or without freeze/thaw methods are approximately comparable. However, storage is significantly easier compared with freeze/thaw methods. The mechanical properties increase significantly with increasing concentration Cp.

At concentrations Cp >40%, increasingly better mechanical properties are obtained by storage as compared with freeze/thaw methods and at concentrations >50% heat treatments become increasingly advantageous. At a concentration Cp of 60%, for example, gel formation can begin at temperatures around 100° C., especially when using a significant fraction of PVA2.

In the concentration range Cp where gel formation as a result of storage above the freezing point is appropriate, the mechanical properties increase significantly with the storage time and the degree of swelling in water decreases significantly, the kinetics being accelerated by a fraction of short-chain PVA2 and by a regular structure of the PVA used.

Over the entire concentration range Cp various further process steps can be applied alternatively or additionally in order to increase the network density and therefore the mechanical properties and reduce the degree of swelling. For example, the PVA-swelling agent mixtures can be dried slowly to an equilibrium water content in atmospheres with set water activity, with heat treatment at temperatures of 100-180° C., for example, being optionally carried out subsequently, and after gel formation has taken place at least partly, the gel can be swollen and undergo a freeze/thaw process in this state. Cross-linking by high-energy radiation is also possible after partial to complete gel formation. A plurality of processes and variants are described in the prior art which so far, however, have only be applied to PVA-swelling agent mixtures prepared by solution methods. These methods can alternatively or additionally also be used in the concentration range Cp which can be made accessible by using thermoplastic methods and to PVA-swelling agent mixtures having a fraction of PVA2 and/or PVA3.

Conventional PVAGs are typically opaque and organic solvents which must then be completely removed from the gel are used to obtain transparency. With the gels according to the invention it was established that when using thermoplastic methods at Cp higher than about 30%, completely transparent PVAG could be obtained and this transparency could be obtained after swelling both with and without a fraction of PVA2 in the PVAG. This transparency is probably attributable to the fact that at high Cp the typical structure sizes of the PVAG (microporosity) are below the wavelength of visible light as a result of which the PVAG appears homogeneous for this wavelength and no turbidity occurs. Astonishingly, transparency could also be obtained if the PVAG has a water content of >70% after gel formation at Cp >30% as a result of swelling. Thus, transparent PVAG with water contents <around 80% could be obtained in a simple fashion.

Swelling agents in the narrower sense and also solvents are designated here as swelling agents. The most important swelling agent is water and water is used in most cases as the only swelling agent or in mixtures with other swelling agents, in addition however the solvents and swelling agents and mixtures thereof described in the prior art can also be considered such as, for example, DMSO, dimethyl formamide, acetamide or polyols such as, for example, glycerol, erythritol, xylitol, sorbitol, mannitol, galactitol, tagatose, lactitol, maltitol, maltulose, isomalt, methylene glycol, ethylene glycol, diethylene glycol, triethylene glycol, propylene glycol, butane diol, pentane diol, hexane triol. The swelling agent can also have a fraction of salt (physiological saline solution).

In addition to PVA, the PVAG can contain further polymers for modifying the properties and for specific applications, for example, synthetic polymers such as for example, polycarbonate, polyacrylate and polymethacrylate, polyethylene glycol, polyethylene oxide, polyvinyl pyrrolidone, polycaprolactone or polymers of natural origin such as, for example, hydrocolloids and polysaccharides, especially starch and starch derivatives.

Simple fillers and functional fillers or active substances are designated as additives, such as for example clay minerals for PVAG which are used as cooling medium, or antimicrobial substances for PVAG used as wound coverings or medicaments for PVAG used as release systems for these medicaments, for example, in the form of dermal gels, pills or tablets. With regard to additives, reference is further made to the prior art relating to PVAG.

The PVAG according to the invention can replace conventional PVAG in all its applications where such a replacement is advantageous as a result of the simplified method of manufacture and the improved mechanical properties. Typical applications of PVAG are in the field of biomedicine, for example, in the field of tissue and scaffold engineering and in orthopaedics, for example, PVAG as artificial organs and membranes, as heart valves, vessels, urethra, tendons, cartilage, meniscus or intervertebral disks, further PVAG can advantageously be used as dermal gels, for example, as wound coverings and/or for controlled release of active substances via the skin and as controlled release systems for oral, rectal and implantable active substance formulations, and also as release systems in the field of agriculture (herbicides, fungicides, insecticides, etc.). Further applications relate to filters and technical membranes, analytic gels in the field of chromatography and electrophoresis, or the use of PVAG as a cooling and insulating medium, as hydrophilic films and foils or as substrates for biological cultures.

EXAMPLES

The PVAG according to the invention was prepared using a Brabender kneader where PVA in the form of granules was plasticised together with water at speeds of 80-120 rpm and mass temperatures of 95-105° C. for 3-7 min and a thermoplastic melt was thus obtained. In the case of PVAG having a PVA2 fraction of >15%, PVA1 was first at least partly plasticised and only then was the short-chain PVA2 added. If PVA1 and PVA2 were plasticised together with high fractions of PVA2, the PVA2 rapidly formed a melt of comparatively low viscosity with the result that it was impossible to apply significant shear forces to the PVA1 and the plasticisation of PVA1 took a very long time or was completely impossible.

The melt obtained was then pressed in a plate press to give films 0.5 mm thick. For water contents W>50%, the pressing temperature was 120° C. and at lower water contents it was 140°. After a pressing time of 5 min, the press was cooled at the maximum cooling rate. The films were then packaged using Saran films to keep the water content constant. These films protected from the atmosphere were stored at room temperature and/or subjected to freeze/thaw treatments. In the freeze/thaw method the films were cooled at a rate of around 0.2° C. to −20° C., stored for 12 hours at this temperature and then thawed again at 0.2° C. and optionally re-frozen. The water content of the films was determined by weighing the drying losses over phosphorus pentoxide for 24 h.

The PVAG (PV21) studied as a reference was obtained by first preparing a solution with Cp=13% at 95° C. for 1 h which was then cast into a film 0.5 mm thick. In order to keep the water content constant during the subsequent freeze/thaw cycles, the film was likewise covered with Saran film. The freeze/thaw cycles were carried out as described above.

The mechanical properties were determined using an Instron tensile tester, the samples were punched from the films and had a sample length of 13 mm and a width of 2 mm. The creep rate was 10 cm/min. The measured values obtained are respectively averages of at least 5 individual tensile tests. The water content of the samples being studied was determined after the tensile test as a control.

To measure the swelling rate, film samples having the weight M0 at RT were stored in distilled water for 24 h. The degree of swelling was then determined as Q=Mq/M0 where Mq was the weight of the swollen film. The surface water was removed with absorbent paper to measure Mq.

Example 1

Figure 1:
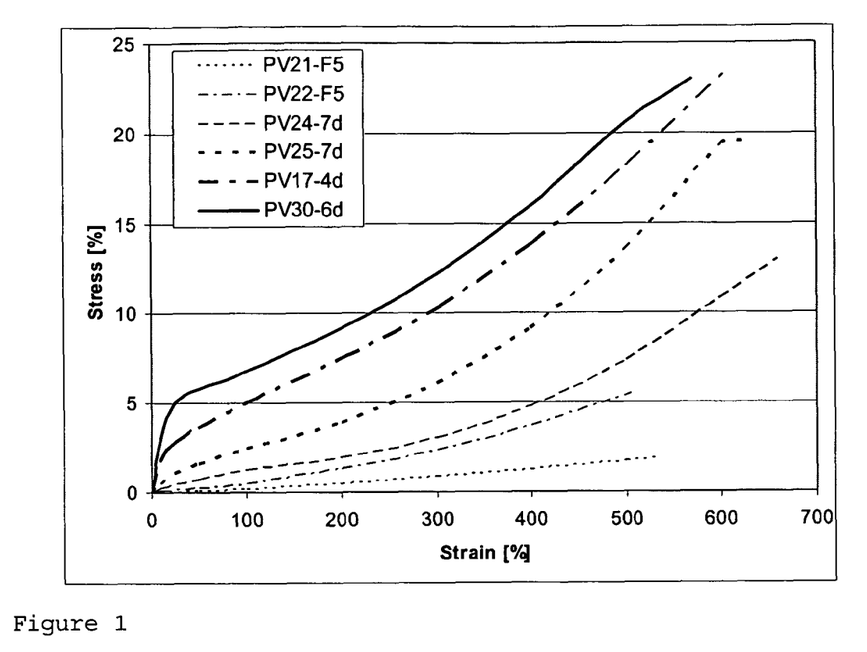
FIG. 1 shows stress-strain curves for PVAGs of Example 1.

FIG. 1 shows the stress-strain curves of various PVAGs. The composition of the PVAG and the preparation parameters can be seen from Table 1:

TABLE 1

| No. | PVA1 | PVA2 | PVa2 [%] | W [%] | Treatment |
|---|---|---|---|---|---|
| PV21-F5 | DP = 4500, DH = 99.4 mole % | | 0 | 87 | 5 cycles |
| PV22-F5 | DP = 4500, DH = 99.4 mole % | | 0 | 73 | 5 cycles |
| PV24-7d | DP = 4500, DH = 99.4 mole % | | 0 | 52 | 7 days at RT |
| PV25-7d | DP = 4500, DH = 99.4 mole % | | 0 | 41 | 7 days at RT |
| PV17-4d | DP = 4500, DH = 98.5 mole % | DP = 360, DH = 98.5 mole % | 20 | 33 | Tempered at 70° C., then 4 days at RT |

TABLE 1-continued

| No. | PVA1 | PVA2 | PVa2 [%] | W [%] | Treatment |
|---|---|---|---|---|---|
| PV30-6d | DP = 4500, DH = 98.5 mole % | DP = 360, DH = 98.5 mole % | 40 | 28 | Tempered at 110° C., then 6 days at RT |

The PVAG PV21-F5 was obtained in accordance with the prior art with Cp=13% or a water content W=87% from a solution which had undergone 5 freeze/thaw cycles. The relevant stress-strain curve represents the mechanical properties which can be obtained in accordance with the prior art starting from a solution and subsequent freeze/thaw cycles. In this case, the stress increases continuously in the tensile test, with the slope of the curve also increasing and over the entire strain range, the second derivative of the curve is positive, i.e., a positive curvature of the curve exists.

The PVAG PV22-F5 was prepared with a water content W=73% using a thermoplastic method since it was no longer possible to prepare a solution with this water content as a result of the viscosity being too high. The highly viscous PVA-water mixture was then subjected to 5 freeze/thaw cycles. An increased modulus of elasticity around 0.5 MPa and an increased strength around 5 MPa was measured and the curvature of the curve is again positive over the entire strain range. The mechanical properties of PV22-F5 are typical of PVAG which can be obtained from the solution with subsequent freeze/thaw cycles if additional methods are applied subsequently, such as a partial freeze drying or drying at low relative humidities, for example. Thus, PV22-F5 represents the maximum of the mechanical properties which is presently feasible in accordance with the prior art by means of a combination of methods. However, in the case of PV22-F5 such a property profile was obtained merely by using freeze/thaw cycles since a high concentration Cp could be processed by means of a thermoplastic method.

The PVAG PV24-7d was prepared with a water content W=52% by means of a thermoplastic method and then stored for 7 days at RT. With this low water content the gelling process is clearly possible at RT and thus significantly improved mechanical properties were obtained compared with the prior art with a modulus of elasticity around 2.5 MPa and a strength around 13 MPa and in addition, the breaking elongation increased from around 500% to around 650%. In this case, a qualitative change in the stress-strain curve can be observed since a negative curvature appears at around 100% strain.

In the case of PVAG PV25-7d the water content was further reduced to 41% and again without freeze/thaw cycles, a PVAG now having a modulus of elasticity of around 5 MPa and a strength of around 20 MPa with a breaking elongation of around 600% was obtained merely by storing at RT. The negative curvature after an initially high slope of the curve has become still clearer for this PVAG, i.e. the PVAG can absorb a high stress even with comparatively low strain whereby new possible applications are feasible compared with PVAG according to the prior art. The PVAG P25-7 can absorb a stress of 2 MPa with a strain in the range of 50% whereas the PVAG PV21-F5 only reaches this stress at 500% strain.

The trend towards significantly improved mechanical properties which has been described, especially towards a steep increase in the curves at low strains (high modulus of elasticity) followed by negative curvature continues with PV17-4d and PV30-6d where a PVA2 fraction of 20 to 40% relative to PVA was used. This PVAG was also prepared using a thermoplastic method and without using freeze/thaw cycles, where in the case of PV17-4d the highly viscous PVA-water mixture was tempered at 70° C. and then stored for 4 days at RT whereas in the case of PV30-6d the tempering was carried out at 110° C. and the PVAG was then stored for 6d at RT. At the water contents of 33 or 28% used, rapid gel formation is initiated at temperatures significantly above RT whereas gel formation proceeds slowly at RT and the application of freeze/thaw cycles is comparatively inefficient. In the case of PV30-6d a modulus of elasticity of around 30 MPa and a strength of 23 MPa were obtained with a still astonishingly high strain of 550%, i.e. the modulus of elasticity was improved by a factor of around 300 compared with PV21-F5. In addition to the reduced water content, this massive increase in the modulus of elasticity can be attributed to the fraction of short-chain PVA2 which makes it possible to achieve a high crystallisation rate and a very high crystallinity of the PVAG. It is astonishing that despite the fraction of short-chain PVA2, the breaking elongation still reaches very high values which can be attributed to the fact that the mixture of PVA1 and PVA2 does not result in phase separation but heterocrystallites are formed. The PVAG PV30-6d can already absorb a high stress under tensile stressing at low strains. Under compression such a high stress is achieved with even lower deformation. Thus, PV30-6d satisfies the requirements relating to mechanical properties which are a prerequisite for the application as replacement intervertebral disks for example.

Example 2

Figure 2:
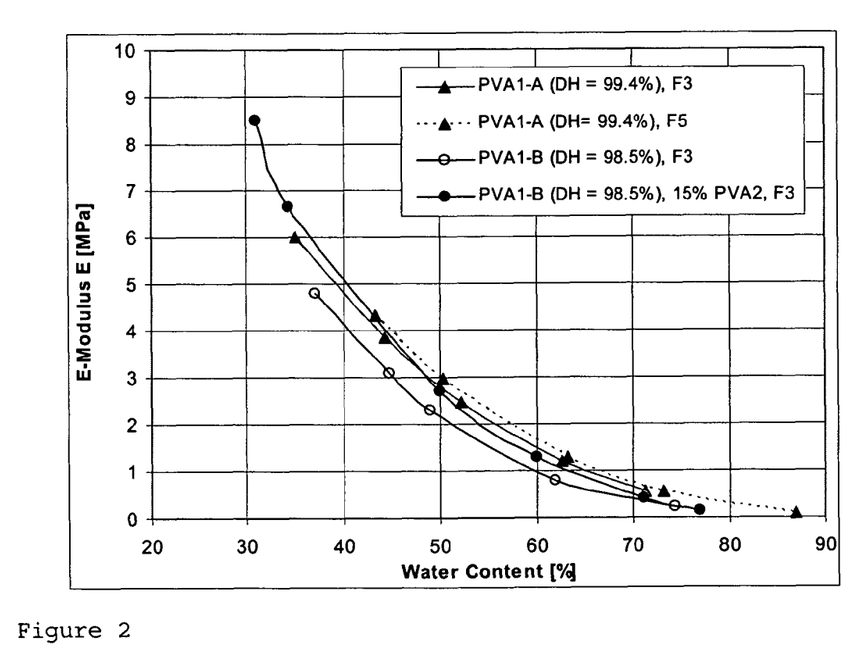
FIG. 2 shows the profile of modulus of elasticity of PVAG after freeze/thaw cycles as a function of water content (W)

FIG. 2 shows the profile of the modulus of elasticity of PVAG after 3 (F3) and 5 (F5) freeze/thaw cycles as a function of the water content W of the PVA-water mixture for various PVA and PVA mixtures. With the exception of PVAG with 87% water content which was prepared starting from a solution, all the other PVAGs were prepared using thermoplastic methods. Solutions based on the polyvinyl alcohols PVA1-A and PVA1-B which both have a degree of polymerisation DP of around 4500, reach the limiting viscosity for solutions of 10,000 cPa at 80° C. at approximately Cp 15%, i.e. with an 85% water content so that the preparation of solutions and pouring is no longer possible at lower water contents. The range of water contents W<85% where a massive increase in the modulus of elasticity and therefore the mechanical properties can be obtained is only accessible by the PVAG according to the invention. It is clearly manifest that the water content is the dominant parameter relating to the resulting modulus of elasticity which increases increasingly strongly with decreasing water content.

The curves PVA1-A, F3 and PVA1-A, F5 show on the one hand that PVA-water mixtures with reduced water content and prepared by means of thermoplastic methods after applying freeze/thaw cycles also produce gels where the modulus of elasticity increases with the number of cycles, as is usual with conventional PVAG.

The curve for PVA1-B, F3 has lower values compared with PVA1-A, F3 over the entire range of water contents, which can be attributed to the fact that the degree of hydrolysis, 98.5 mole %, is reduced compared with 99.4 mole % for PVA1-A so that the crystallisability of these macromolecules is reduced (irregularities in the polymer chain).

The PVAG to PVA1-B, 15% PVA2, F3 is also based on PVA1-B with DH=98.5%, but contains 15% PVA2 relative to the PVA fraction, a short-chain PVA having a degree of polymerisation DP of 360 and DH=98.5 mole %. When W>70%, there are no significant differences in the modulus of elasticity compared to PVA1-B, F3, which is astonishing since according to the prior art, a reduction in the mechanical properties is expected when using a PVA with low DP, which is why PVA with the highest possible DP is used. It is even more astonishing that with decreasing W, the modulus of elasticity increases compared with PVA1-B, F3 and even when W=approx. 47% reaches the PVAG values of PVA1-A, F3, which are based on a PVA with DH=99.4 mole % whereas PVA2 with DH=98.5 mole % has a lower degree of hydrolysis. Further, when W<45% even the moduli of elasticity of PVA1-A,F5 are exceeded. It is hereby shown that by using a fraction of a short-chain PVA, the mechanical properties of the PVAG can be improved and higher moduli of elasticity can be obtained even compared with PVAG which are based on PVA with higher DH and underwent more freeze/thaw cycles. These advantages when using a short-chain PVA (PVA2) together with a long-chain PVA (PVA1) are attributed to the better crystallisability of the PVA2 whereby higher network densities are also achieved. This effect increases with decreasing water content.

Figure 3:
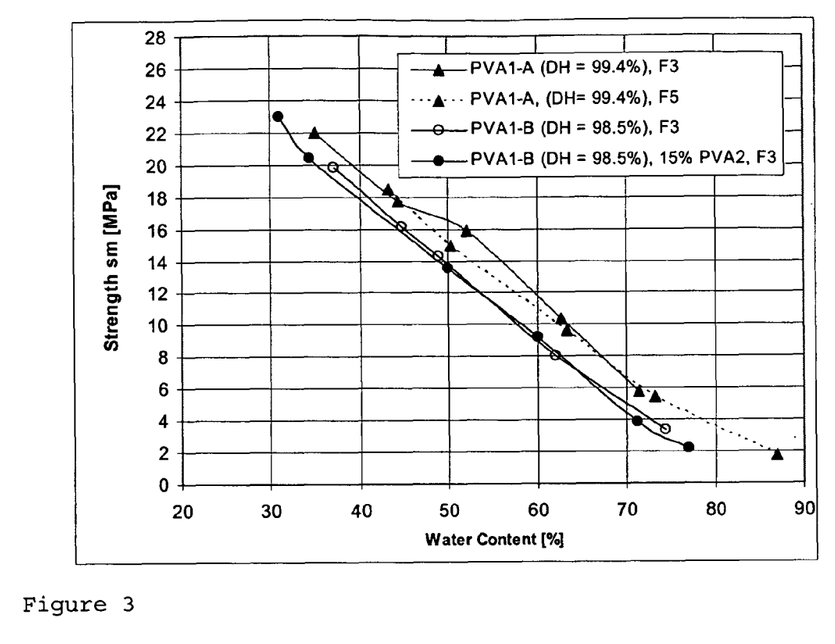
FIG. 3 shows strength (sm) of PVAG as a function of water content (W)

FIG. 3 shows the strength sm of the PVAG as a function of the water content W for the various PVAG. With regard to this property, the influence of a fraction of 15% PVA2 is almost neutral i.e. when a 15% fraction in PVA1-B, F3 is replaced by PVA2, there is hardly any influence on the strength. However, it should be noted that as a result of the fraction of PVA2, the viscosity of the melt was reduced considerably and thus the processability was made easier which is especially important at low W. Compared to the modulus of elasticity E, the strength sm is of lesser importance since the PVAG undergoes significant irreversible deformations at strains of around >50%. Such irreversible deformations are undesirable when PVAG is used in practice and the stressing must not exceed the reversible range.

Example 3

Figure 4:
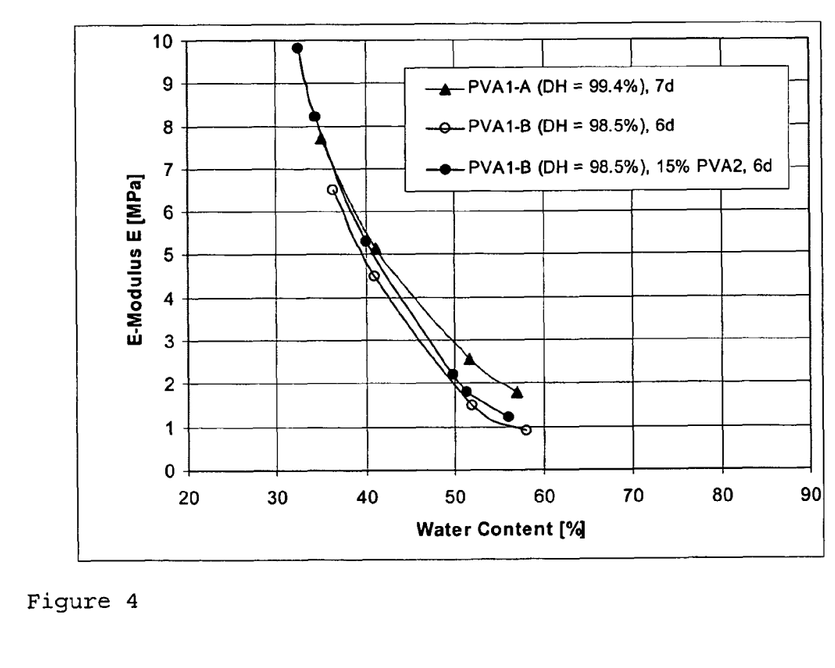
FIG. 4 shows the modulus of elasticity of PVAG as a function of water content (W)

In FIG. 4 the moduli of elasticity of PVAG obtained using a thermoplastic method are plotted as a function of the water content W. The PVAG was stored after shaping at RT for 7 or 6 days, i.e., the PVAG was obtained without using freeze/thaw cycles. It is clear that especially in the range W<60% PVAGs can be obtained without using freeze/thaw cycles by simple storage at RT. In this case, the PVAGs based on PVA1-A with the higher degree of hydrolysis have the highest moduli of elasticity. The PVAG based on PVA1-B containing a 15% fraction of short-chain PVA shows slightly higher moduli of elasticity in the range 50%<W<60% compared with the PVAG based on PVA1-B, where the values of PVAG based on PVA1-A are increasingly achieved with decreasing W. The situation is similar to the PVAGs which were obtained using freeze/thaw methods (FIG. 2). It is also shown here that PVAGs containing a fraction of PVA2 yield higher moduli of elasticity and can even achieve the moduli of elasticity of PVAGs which are based on higher hydrolysed PVA.

Figure 5:
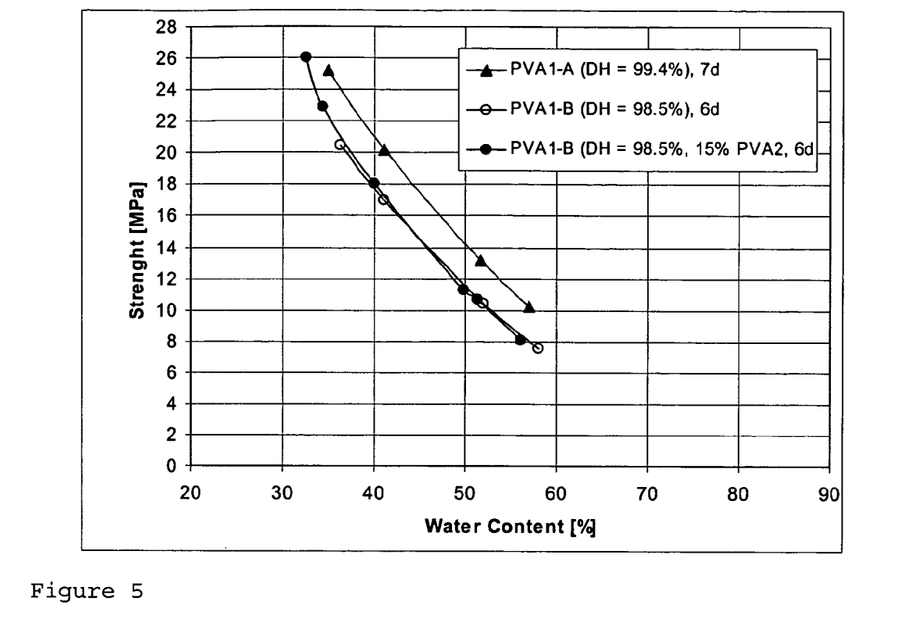
FIG. 5 shows the strength (sm) of PVAG without freeze/thaw cycles but storage at room temperature (RT)

The strengths sm as a function of the water content of PVA obtained without freeze/thaw but by means of simple storage at RT are reproduced in FIG. 5. The situation here is also similar to the PVAG which was obtained by means of freeze/thaw cycles (FIG. 3).

Figure 6:
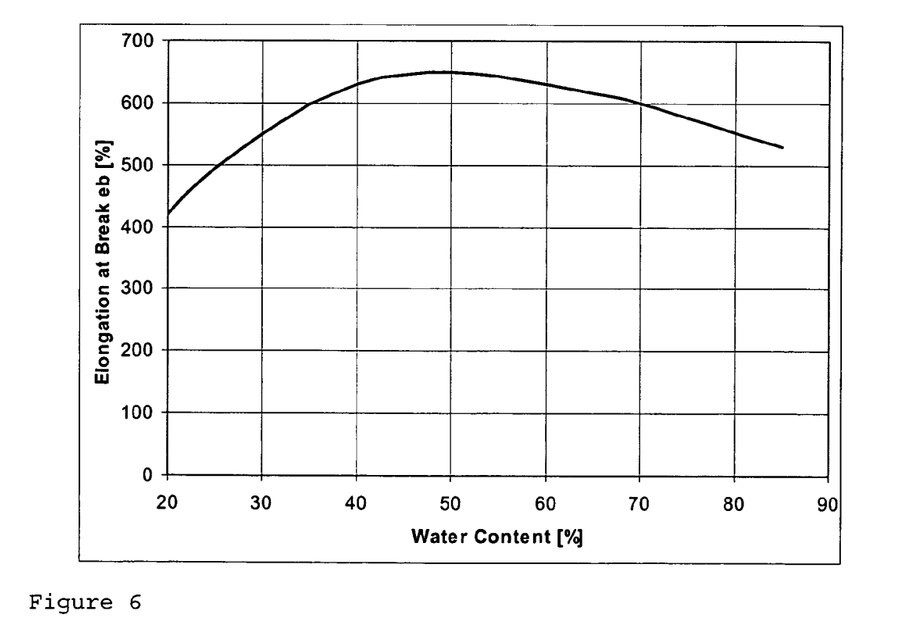
FIG. 6 shows breaking elongation as a function of (W)

The breaking elongation eb of PVAG with developed network is only slightly dependent on the formulation, the preparation parameters and the storage time or the number of freeze/thaw cycles. The important parameter here is also the water content. FIG. 6 gives the breaking elongation eb as a function of the water content, where a maximum of around 650% exists in the range of 40%<W<60%. At higher and lower water contents W, eb decreases but even when W+30% very high breaking elongations with eb around 55% can still be achieved.

Example 4

Figure 7:
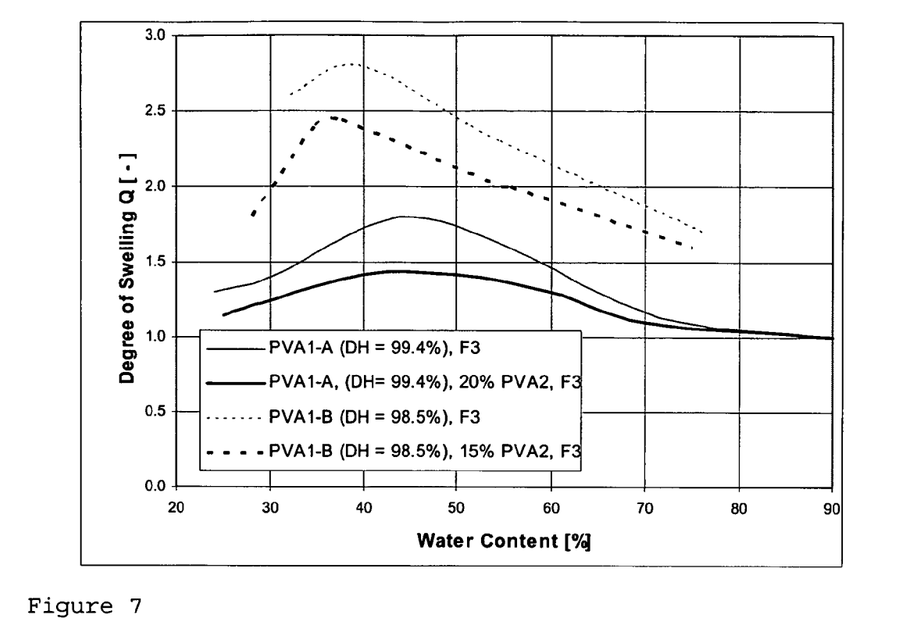
FIG. 7 shows swelling (O) as a function of (W) after freeze/thaw cycles.

FIG. 7 shows the degrees of swelling Q for various PVAGs obtained after 3 freeze/thaw cycles as a function of the water content of the PVAG. With the application of a higher number of cycles, the degrees of swelling decrease continuously. The profile of the degrees of swelling with the PVAG water content obtained by storage at RT is comparable to the profile of the degrees of swelling of PVAG prepared by means of freeze/thaw cycles and a reduction in the degrees of swelling is likewise obtained with an increase in storage time.

The degrees of swelling of PVA1-B, F3 lie at significantly higher values over the entire water content range compared with the degrees of swelling of PVA1-B, F3. This is a consequence of the lower degree of hydrolysis of PVA1-B or PVA1-A with DH=98.5 mole % compared with DH=99.4 mole %. In the range of these high degrees of hydrolysis there is a very marked dependence not only of the degree of swelling on the degree of hydrolysis. When DH=100 mole %, the degrees of swelling are significantly lower compared with DH=99.4%. The influence of the degree of hydrolysis is typical for the other parameters such as 1,2-glycol content and tacticity which strongly influence the crystallisability. In this case, the degree of swelling increases with the 1,2-glycol content and decreases with increasing syndiotactic fraction. These material parameters should therefore be optimised to obtain minimal degrees of swelling.

Surprisingly, the degrees of swelling of PVA1-B having a 15% fraction of short-chain PVA2 have lower values than the degrees of swelling of PVA1-B without a PVA2 fraction, i.e. in addition to said parameters having their known effect, a PVA2 fraction is also important with regard to lower degrees of swelling. A comparison of PVA1-A, F3 with PVA1-B having 15% PVA2 shows that this effect occurs even when the degree of hydrolysis of PVA2 is comparatively low, at 98.5 mole %. The effect is even more marked when using PVA2 having a higher degree of hydrolysis. This behaviour is based on the fact that the crystallinity and the network density are increased with the PVA2 fraction, i.e. finer-mesh networks are obtained which can swell less strongly. The results for the degrees of swelling suggest that when using PVA1 with a fraction of PVA2 where both PVAs have maximum degrees of hydrolysis, minimal 1,2 glycol contents and high syndiotactic fractions, minimal degrees of swelling can be obtained over the entire water content range, i.e. degrees of swelling only slightly higher than 1.

Example 5

Figure 8:
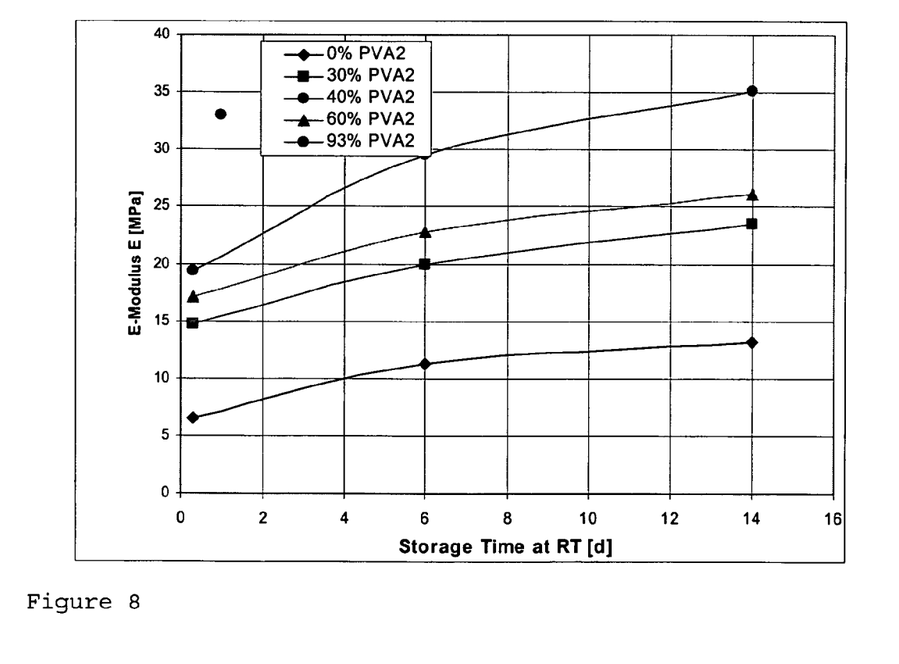
FIG. 8 shows the modulus of elasticity as a function of storage time at (RT).

FIG. 8 shows the development of the modulus of elasticity as a function of the storage time at RT for PVAGs having various fractions of PVA2. The PVAGs are based on PVA1-B with DH=98.5 mole % and DP=4500 and a PVA with DH=98.5 mole % and DP=360 was used as PVA2. The PVAGs were prepared using a thermoplastic method with a water content of 31% and tempered at 110° C. It is clearly shown that the moduli of elasticity increase with the PVA2 fraction which is attributable to the good crystallisability of the short-chain PVA2. The measured value for 97% PVA2 shows this very clearly. The breaking elongations eb of the PVAGs were astonishingly not significantly dependent on the PVA2 fraction even when the PVA2 fraction was 60% and were barely 600% for all PVAGs with the exception of the PVAG having a 97% fraction of PVA2, where around 100% was still achieved despite the very high fraction. The strengths sm also showed no clear dependence on the PVA2 fraction up to 40% PVA2 and were slightly greater than 20 MPa for a storage time of 6 days whereas when the PVA2 fraction was 60%, a reduction to 14 MPa was determined. The degrees of swelling after a storage time of 1d showed a clear dependence on the PVA2 fraction and were 1.7, 1.4, 1.3, 1.2 and 1.05 for fractions of 0, 30, 40, 60 and 97%.

During the preparation of thermoplastic melts consisting of PVA1-B and PVA2 as well as 31% water, it was found that gel formation is already initiated at temperatures >100° C. which is why the heat treatment was carried out at 110° C. Clearly however, further cross-linking takes place as a function of time even at RT. By using PVA1 and PVA2 with higher degrees of hydrolysis, reduced 1,2-glycol content and a high syndiotactic fraction, the kinetics of network formation is accelerated and even lower degrees of swelling can be obtained.

Example 6

The development of the mechanical properties during storage at RT and under freeze/thaw treatment is compared in the following example. The PVAG was prepared by means of a thermoplastic method based on a PVA1-B with DH=98.5 mole % and DP=4500, and 20% of PVA2 with DH=98.5 mole % and DP=360 was used. The PVAG was heat-treated at 70° C. and then stored at RT or subjected to freeze/thaw cycles. The mechanical properties are given in Table 2:

TABLE 2

| Treatment | Cycles [ ] | $t_{RT}$ [d] | Cp [%] | E [MPa] | $s_m$ [MPa] | $e_b$ [%] |
|---|---|---|---|---|---|---|
| Storage |  | 1 | 68 | 7.40 | 21.90 | 560 |
| Storage |  | 3 | 68 | 18.50 | 22.50 | 591 |
| Storage |  | 7 | 68 | 22.30 | 23.50 | 602 |
| Storage |  | 14 | 68 | 24.10 | 24.70 | 621 |
| Freeze/thaw | 1 |  | 68 | 18.40 | 22.50 | 587 |
| Freeze/thaw | 5 |  | 68 | 19.40 | 23.60 | 582 |
| Swollen |  | 7 | 68 | 5.30 | 10.60 | 541 |
| Swollen |  | 14 | 68 | 10.20 | 14.10 | 583 |
| Swollen |  | 21 | 68 | 13.70 | 17.40 | 592 |

After a storage time of 3 days the mechanical properties obtained were almost identical to those after one freeze/thaw cycle. However, whereas the mechanical properties increase during further storage at RT, the difference after 1 or 3 freeze/thaw treatments is only small. The mechanical properties of the PVAG swollen in water also increase significantly with the storage time at RT. When using completely hydrolysed PVA with a minimal 1,2-glycol content and high syndiotactic fraction, the mechanical properties of the swollen PVAG are almost identical to the mechanical properties of the corresponding unswollen PVAG.

The invention claimed is:

1. A polyvinyl alcohol gel comprising at least two different polyvinyl alcohols and a swelling agent, each polyvinyl alcohol being of the type selected from the group consisting of PVA1, PVA2 and PVA3, wherein the degrees of polymerisation ("DP") of PVA1 and PVA3 are >1000 and the degree of polymerisation ("DP") of PVA2 is in the range of 50-1000 and wherein PVA1 and PVA2 are predominantly linear whereas PVA3 has a fraction of long-chain branchings.

2. The polyvinyl alcohol gel according to claim 1, wherein the gel has a modulus of elasticity E and/or a strength sm in MPa is >5.

3. The polyvinyl alcohol gel according to claim 2, wherein the modulus of elasticity E and/or strength sm is >10.

4. The polyvinyl alcohol gel according to claim 3, wherein the modulus of elasticity E and/or strength sm is >15.

5. The polyvinyl alcohol gel according to claim 2, wherein the modulus of elasticity E and/or strength sm is >20.

6. The polyvinyl alcohol gel according to claim 1, wherein the gel is obtained from a mixture of polyvinyl alcohol and swelling agent, wherein the viscosity of the mixture during forming is >10,000 mPa.

7. A process for preparing the gel of claim 6, including extruding the mixture to obtain a gel formation.

8. The process according to claim 7, including storing the gel formation at a temperature above the freezing point.

9. The polyvinyl alcohol gel according to claim 1, wherein
   a) the degree of hydrolysis of PVA1, PVA2 and PVA3 in mole % is >95;
   b) the 1,2-glycol content of PVA1, PVA2 and PVA3 in mole % is <3; and
   c) the number of short-chain branchings of PVA1, PVA2 and PVA3 per monomer unit is <$10^{-2}$.

10. The polyvinyl alcohol gel according to claim 1, wherein
    a) the degree of hydrolysis of PVA1, PVA2 and PVA3 in mole % is >98;
    b) the 1,2-glycol content of PVA1, PVA2 and PVA3 in mole % is <1; and
    c) the number of short-chain branchings of PVA1, PVA2 and PVA3 per monomer unit is <$10^{-3}$.

11. The polyvinyl alcohol gel according to claim 1, wherein
    a) the degree of hydrolysis of PVA1, PVA2 and PVA3 in mole % is >99;
    b) the 1,2-glycol content of PVA1, PVA2 and PVA3 in mole % is <0.5; and
    c) the number of short-chain branchings of PVA1, PVA2 and PVA3 per monomer unit is <$10^{-4}$.

12. The polyvinyl alcohol gel according to claim 1, wherein
    a) the degree of hydrolysis of PVA1, PVA2 and PVA3 in mole % is >99.8;
    b) the 1,2-glycol content of PVA1, PVA2 and PVA3 in mole % is <0.2; and
    c) the number of short-chain branchings of PVA1, PVA2 and PVA3 per monomer unit is <$10^{-6}$.

13. The polyvinyl alcohol gel according to claim 1, wherein
    a) PVA1 and PVA3 have a degree of polymerisation DP >1000; and
    b) PVA2 has a degree of polymerisation DP in the range of 50-1000.

14. The polyvinyl alcohol gel according to claim 1, wherein
    a) PVA1 and PVA3 have a degree of polymerisation DP >2000; and
    b) PVA2 has a degree of polymerisation DP in the range of 60-500.

15. The polyvinyl alcohol gel according to claim 1, wherein
    a) PVA1 and PVA3 have a degree of polymerisation DP >3000; and
    b) PVA2 has a degree of polymerisation DP in the range of 70-300.

16. The polyvinyl alcohol gel according to claim 1, wherein
    a) PVA1 and PVA3 have a degree of polymerisation DP >5000; and
    b) PVA2 has a degree of polymerisation DP in the range of 75-200.

17. The polyvinyl alcohol gel according to claim 1, wherein
    a) the fraction of PVA2 relative to PVA in wt. % is in the range of 1-95;
    b) the fraction of PVA3 relative to PVA in wt. % is in the range of 1-80; and
    c) the fraction of PVA relative to PVA and swelling agent in wt. % is in the range of 5-90.

18. The polyvinyl alcohol gel according to claim 1, wherein
    a) the fraction of PVA2 relative to PVA in wt. % is in the range of 2-90;
    b) the fraction of PVA3 relative to PVA in wt. % is in the range of 2-60-; and
    c) the fraction of PVA relative to PVA and swelling agent in wt. % is in the range of 7-95.

19. The polyvinyl alcohol gel according to claim 1, wherein
    a) the fraction of PVA2 relative to PVA in wt. % is in the range of 3-85;
    b) the fraction of PVA3 relative to PVA in wt. % is in the range of 3-50; and
    c) the fraction of PVA relative to PVA and swelling agent in wt. % is in the range of 10-80.

20. The polyvinyl alcohol gel, according to claim 1, wherein the gel has a degree of swelling Q in water in the range of 1.01-3.

21. The polyvinyl alcohol gel, according to claim 1, wherein the gel has a degree of swelling Q in water in the range of 1.03-2.

22. The polyvinyl alcohol gel, according to claim 1, wherein the gel has a degree of swelling Q in water in the range of 1.05-1.5.

23. The polyvinyl alcohol gel according to claim 1, wherein the gel is transparent and free of organic solvents.

24. A process according to claim 7, including preparing the gel into a biomedicine.

25. A process according to claim 7, including preparing the gel into an agriculture product.

* * * * *